(12) United States Patent
Tyagi et al.

(10) Patent No.: US 7,894,211 B2
(45) Date of Patent: Feb. 22, 2011

(54) MICRO WIND TURBINE TOPOLOGY FOR SMALL SCALE POWER GENERATION

(75) Inventors: Abhishek Tyagi, Bangalore (IN);
Shrikant P. Rao, Bangalore (IN);
Somnath S G Ganguly, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 492 days.

(21) Appl. No.: 12/019,517

(22) Filed: Jan. 24, 2008

(65) Prior Publication Data
US 2009/0189393 A1 Jul. 30, 2009

(51) Int. Cl.
H02M 3/00 (2006.01)
H02M 3/335 (2006.01)
F03D 7/04 (2006.01)

(52) U.S. Cl. .................................. 363/15; 290/44
(58) Field of Classification Search .............. 290/44
See application file for complete search history.

(56) References Cited

U.S. PATENT DOCUMENTS

| | | | | |
|---|---|---|---|---|
| 4,184,197 A * | 1/1980 | Cuk et al. | | 363/16 |
| 4,257,087 A * | 3/1981 | Cuk | | 363/16 |
| 5,570,276 A * | 10/1996 | Cuk et al. | | 363/16 |
| 6,285,090 B1 * | 9/2001 | Brutsaert et al. | | 290/55 |
| 6,400,579 B2 * | 6/2002 | Cuk | | 363/16 |
| 7,042,109 B2 * | 5/2006 | Gabrys | | 290/44 |
| 7,333,349 B2 * | 2/2008 | Chang et al. | | 363/17 |
| 7,352,076 B1 * | 4/2008 | Gabrys | | 290/44 |
| 7,417,333 B2 * | 8/2008 | Miller et al. | | 290/44 |
| 7,420,288 B2 * | 9/2008 | Calley | | 290/44 |
| 7,476,987 B2 * | 1/2009 | Chang | | 290/55 |
| 7,728,451 B2 * | 6/2010 | Ichinose et al. | | 290/44 |
| 2002/0079706 A1 | 6/2002 | Rebsdorf et al. | | |
| 2002/0105189 A1 | 8/2002 | Mikhail et al. | | |
| 2002/0190695 A1 | 12/2002 | Wall et al. | | |
| 2004/0021437 A1 | 2/2004 | Maslov et al. | | |
| 2004/0026929 A1 | 2/2004 | Rebsdorf et al. | | |
| 2004/0094964 A1 | 5/2004 | Mikhail et al. | | |
| 2004/0145932 A1 | 7/2004 | Skeist et al. | | |
| 2004/0207208 A1 | 10/2004 | Mikhail et al. | | |
| 2005/0180862 A1 | 8/2005 | Lando | | |
| 2005/0253396 A1 | 11/2005 | Mikhail et al. | | |
| 2010/0109328 A1 * | 5/2010 | Li et al. | | 290/44 |

FOREIGN PATENT DOCUMENTS

| | | | |
|---|---|---|---|
| CN | 101051793 A | * | 10/2007 |
| EP | 1007844 B1 | | 6/2000 |
| EP | 1698781 A1 | | 9/2006 |
| WO | WO 2009070333 A1 | * | 6/2009 |

OTHER PUBLICATIONS

CN 101051793 A Guan et al. Abstract in English, Oct. 10, 2010.*

* cited by examiner

Primary Examiner—Joseph Waks
(74) Attorney, Agent, or Firm—Oral Caglar, Esq.

(57) ABSTRACT

A wind energy converter has a generator adapted to be coupled directly to a wind turbine without need for a mechanical gear unit. A rectifier is coupled to the generator and a converter is coupled to the rectifier to provide a regulated DC bus voltage as a function of a controlled duty cycle. An inverter is coupled to the converter for providing a regulated AC output to a load.

15 Claims, 6 Drawing Sheets

MICRO WIND TURBINE TOPOLOGY FOR SMALL SCALE POWER GENERATION

BACKGROUND

A generator and power transmission system of wind energy converters have a strong influence on the economic efficiency of generating energy from wind. A wind energy converter generally has a wind turbine with a transmission that includes a mechanical gear unit in order to use conventional generators within their normal range of operation. High fluctuations in rotor torque that may be caused by gusts of wind are a major problem in wind energy generating systems. Such rotor torque fluctuations can lead to the use of gear boxes in the transmissions that may be twice the weight of the generator itself. Such gear boxes may greatly increase the cost of a wind energy converter.

In addition, mechanical transmissions generally decrease the converter efficiency, making wind turbines with a convention mechanical transmission unfavorable with respect to mass and efficiency. Other disadvantages, such as wear, maintenance and noise emissions should be considered when designing and building a wind turbine.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in hardware, software or a combination thereof in various embodiments. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 1:
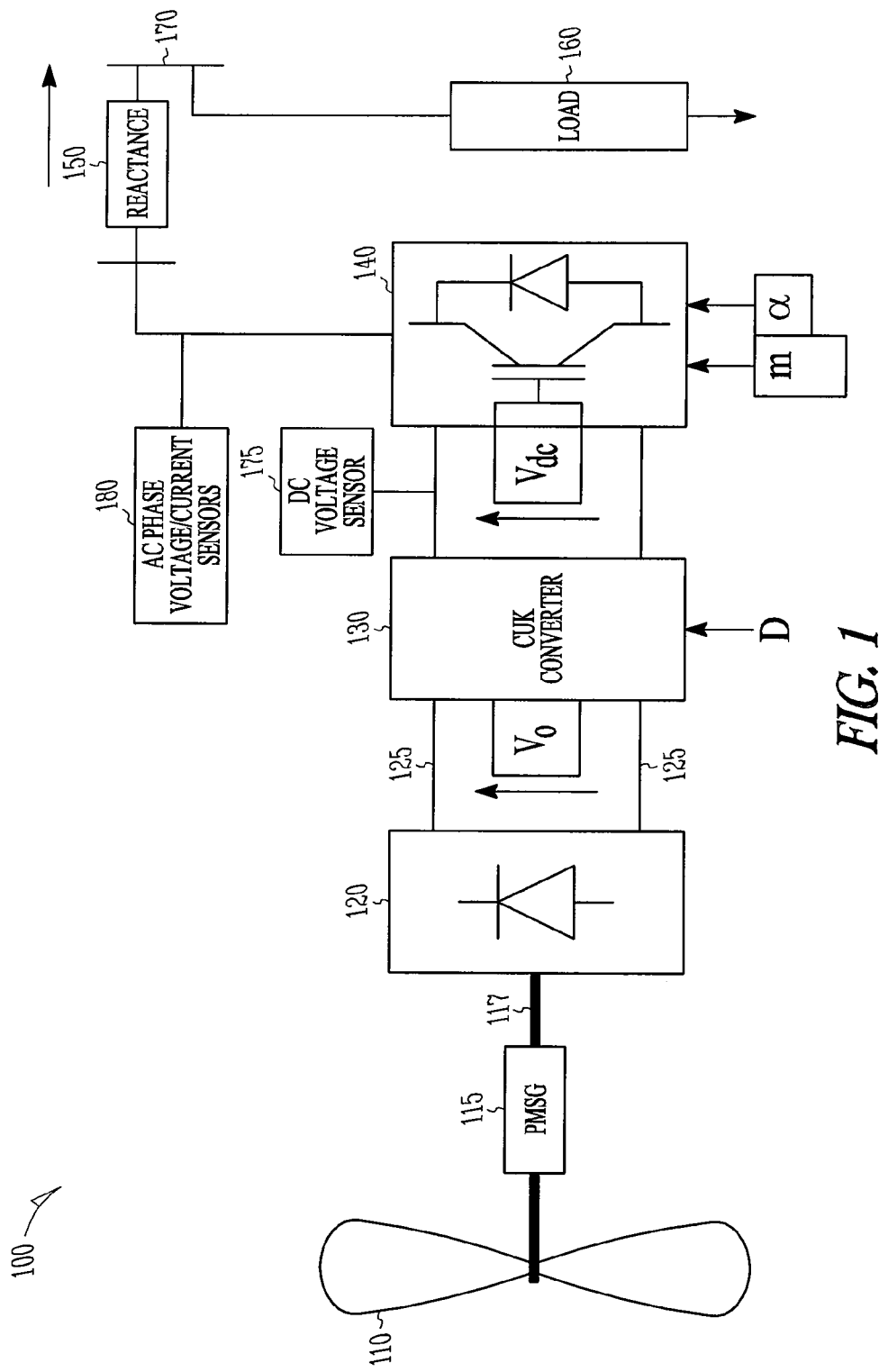
FIG. 1 is a block diagram of a wind energy converter according to an example embodiment.

One embodiment of a wind energy converter is indicated generally at 100 in FIG. 1. A wind turbine with stall control 110 is directly coupled to a generator 115, such as a permanent magnet synchronous generator with stall control, abbreviated PMSG. The direct coupling eliminates the need for a gear box. The output of the generator 115 is a variable frequency and variable amplitude voltage on line 117. PM generator is interfaced via line 117 to an uncontrolled rectifier 120, which converts the variable frequency variable amplitude voltage to a variable DC bus voltage 125, which is regulated through a Cuk converter 130 (buck-boost) or other switched converter, and is then converted to a 50 Hz AC signal through an inverter 140. Inverter 140 may include inputs such as a modulation index "m" to decide an instantaneous peak output voltage, and an alpha input "α" corresponding to a firing angle or PWM 'on time'.

A reactance 150 is coupled to the inverter. In one embodiment, the reactance is typically a series inductance, such as in a coupling transformer, that provides a smoother sinusoidal waveform output. A local load 160 is fed from the inverter and the excess power flows to the grid 170. The load 160 may be part of the grid 170 in some embodiments. In case of stand alone operation the excess power can be either dissipated in a bleeder resistor or can be stored in a battery.

Figure 2:
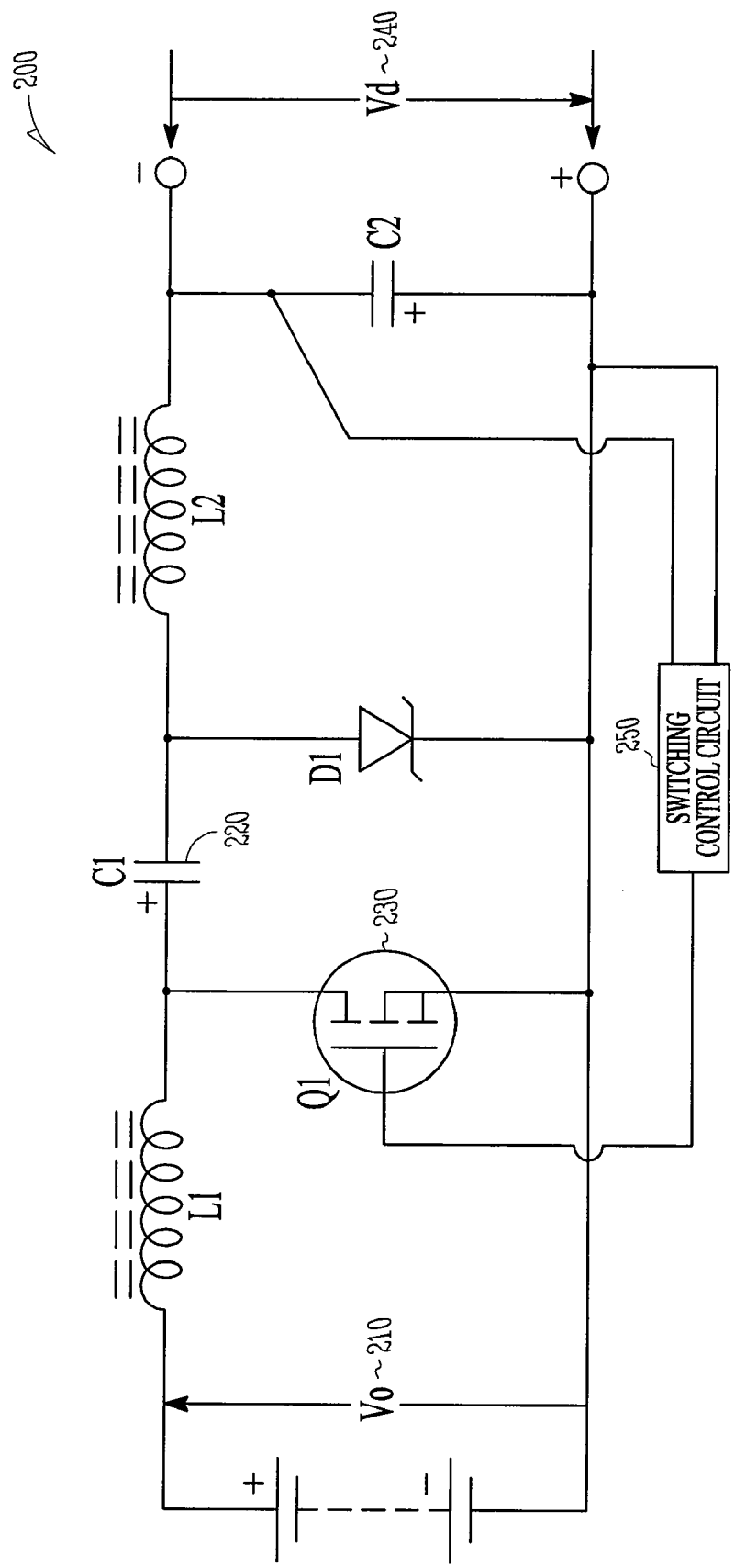
FIG. 2 is a circuit diagram of a converter for the wind energy converter according to an example embodiment.

The DC bus voltage 125 is regulated to a desired value ($V_{dc}$*) by controlling the duty ratio (D) of the converter 130. Further detail of converter 130 is illustrated in a circuit diagram of FIG. 2. In one embodiment, a Cuk converter is used. A Cuk converter is a type of DC-DC converter that has an output voltage magnitude that is either greater than or less than the input voltage magnitude, with an opposite polarity. It uses a capacitor as its main energy-storage component, unlike most other types of converter which use an inductor.

An input voltage 210 charges an energy storage device such as capacitor 220. A switch 230, such as a transistor is used to switch the converter 130 on and off to provide an output voltage 240. The output voltage 240 is provided to a switching control circuit 250 that controls the switch 230 in accordance with a desired duty cycle utilizing a proportional-integral (PI) algorithm in one embodiment.

In Cuk converter 130 for varying input voltage (Vo), the output voltage can be held constant by varying the duty ratio (D) of the switch.

The output voltage (Vdc) is given by:

$$V_{dc} = V_o \frac{D}{1-D}$$

For: 0.05<D<0.95, The output voltage varies in the range, $0.052 V_o < V_{dc} < 19 V_o$.

Now in case the input voltage varies, then the output voltage can be maintained constant for $V_o$ lying in the range, $0/052 V_{dc} < V_o < 19 V_{dc}$.

Figure 3:
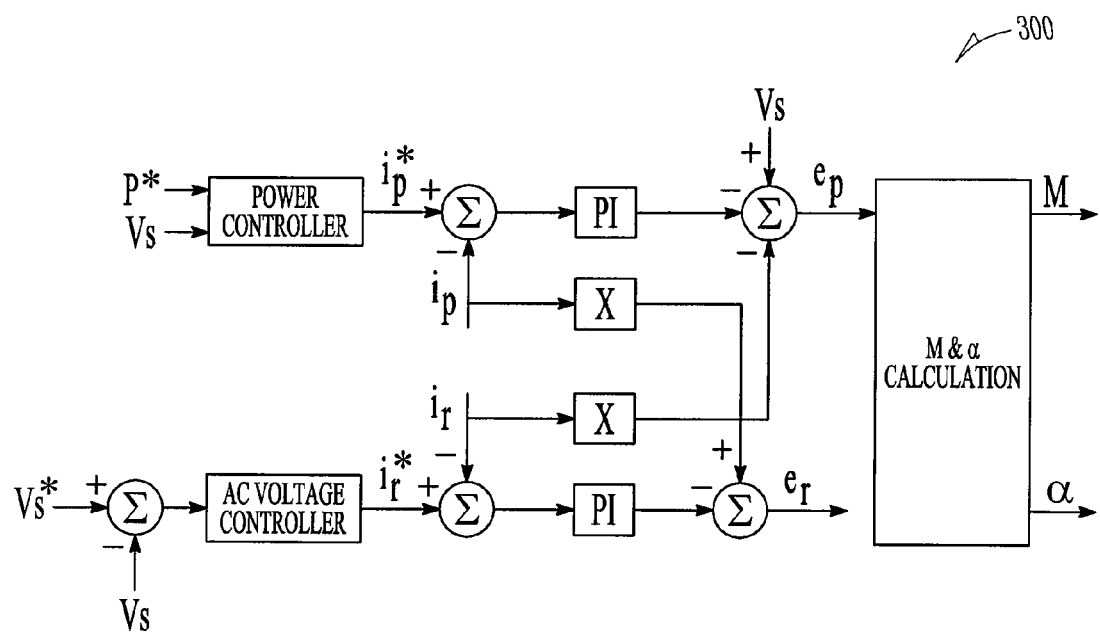
FIG. 3 is a block circuit diagram of a converter controller according to an example embodiment.

Thus, for a wide range of varying wind speed, DC bus voltage can be maintained constant. DC bus voltage feeds the dc-ac inverter An active current control sets the power to be sent through the converter. A reactive current is controlled to ensure constant AC bus voltage. An AC bus voltage controller 300 in FIG. 3 is of proportional-integral (PI) type, whose output determines reference signals for the reactive current loop. The control strategy can be easily implemented in a standard DSP board. Use of a PM generator removes the requirement of reactive power on the wind turbine side, which is an advantage in terms of operation at an improved power factor in comparison to an inductive generator (IG).

Three possible operating modes, according to various wind conditions, are identified. In a normal range of operation, the wind speed has a fairly constant average value, with a small variance of around 1 m/sec (typical value). In such a condition, the amplitude and frequency of o/p voltage from PM generator 115 will have some variation proportional to the wind speed. This variation would be reflected in the rectifier 120 o/p voltage, but due to the PI controller 250 action the DC bus voltage is held constant, this is achieved by continuous modulation of the duty ratio of the converter 130.

If the wind speed increases beyond the rated speed of the generator 115, then to protect the generator from mechanical breakdown and electrical overload the windmill is stalled. Stall control suffices for this application, avoiding the need for a complex pitch angle controller. In one embodiment, the stall control is a form of passive overspeed protection. The turbine blades are aerodynamically designed to lose lift when the angle of attack exceeds a certain design value. This results in the turbine losing torque or producing less torque when a certain design speed is reached or exceeded. Such stall control effectively provides speed limiting. Other forms of stall control may also be used if desired.

However, if there is a sudden increase in the wind speed (but peak is below the max speed), the rectifier 120 o/p voltage would tend to increase. But due to buck action of converter 130 the DC bus voltage is held constant. Under this situation the power that is being fed through the inverter 140 increases and the excess power flows to the grid.

Similarly when there is a sudden wind dip, the power o/p of the PM generator 115 is reduced; under this condition the boost action of converter 130 maintains the DC voltage constant. The power sent through the inverter 140 reduces and the load is supplied by the grid.

In one embodiment, various sensors may be used to sense voltage and current to allow for the described control functions. A DC bus voltage sensor 175 and an AC phase voltage measurement and AC phase currents sensors 180.

In FIG. 3, the following abbreviations are used for various input and output signals:

P measured real power
P* reference real power
Vs measured rms bus voltage
Vs* reference voltage
$i_p$ active component of current
$i_p$* reference value of active component current
$i_r$ reactive component of current
$i_r$* reference value of reactive component current
PI proportional+integral controller
$Y_p, Y_r$ outputs of PI controllers for active and reactive currents
$e_p$ real power control voltage
$e_r$ reactive power control voltage
K modulation index
α firing angle In operation, the real power and output bus voltage may be independently controlled through two decoupled loops to regulate the real and reactive components of the current. The cross coupling terms, as depicted by an equivalent reactance, X, are added to generate the d and q axis components of the control voltage $e_p$, $e_r$. These are then used to compute the modulation index and firing angle for the inverter bridge.

Figure 4:
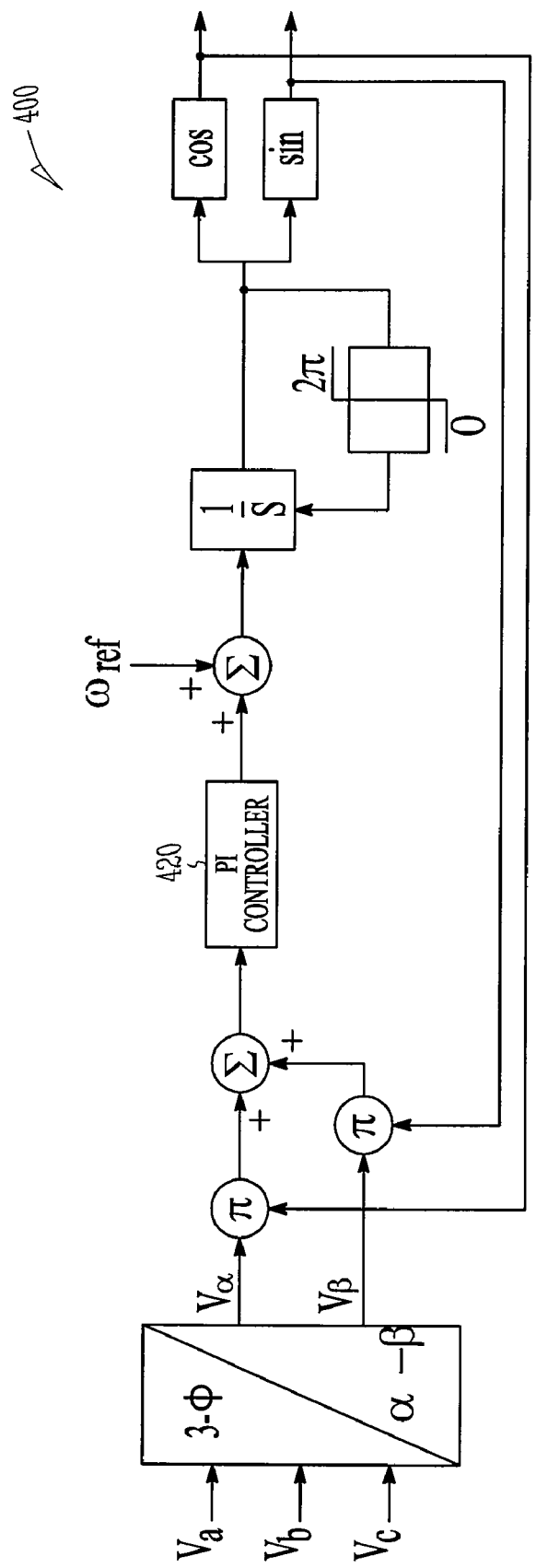
FIG. 4 is a block circuit diagram of a phase locked loop controller according to an example embodiment.

A phase locked loop (PLL) circuit 400 in FIG. 4 is used to obtain the magnitude and phase information from the sensed AC voltages. This phase information provides for current transformation to a synchronously rotating reference frame. Inverter 140 may be controlled with PLL 400 using a vector control scheme based on a PI controller 420.

In PLL circuit 400, $V_a$, $V_b$ and $V_c$ represent the phase voltages. $V_\alpha$, $V_\beta$ correspond to equivalent two phase voltages. In operation, the phase voltages are transformed to generate two phase voltages. The two phase voltages are then multiplied by the cosine and sine of the phase angle to generate dω/dt. This is integrated to give the speed, ω. The speed is compared to a reference speed $\omega_{ref}$ and then integrated to generate the phase angle. In steady state, the input to this second entegrator settles to zero and the output of the integrator tracks the phase angle.

Figure 5:
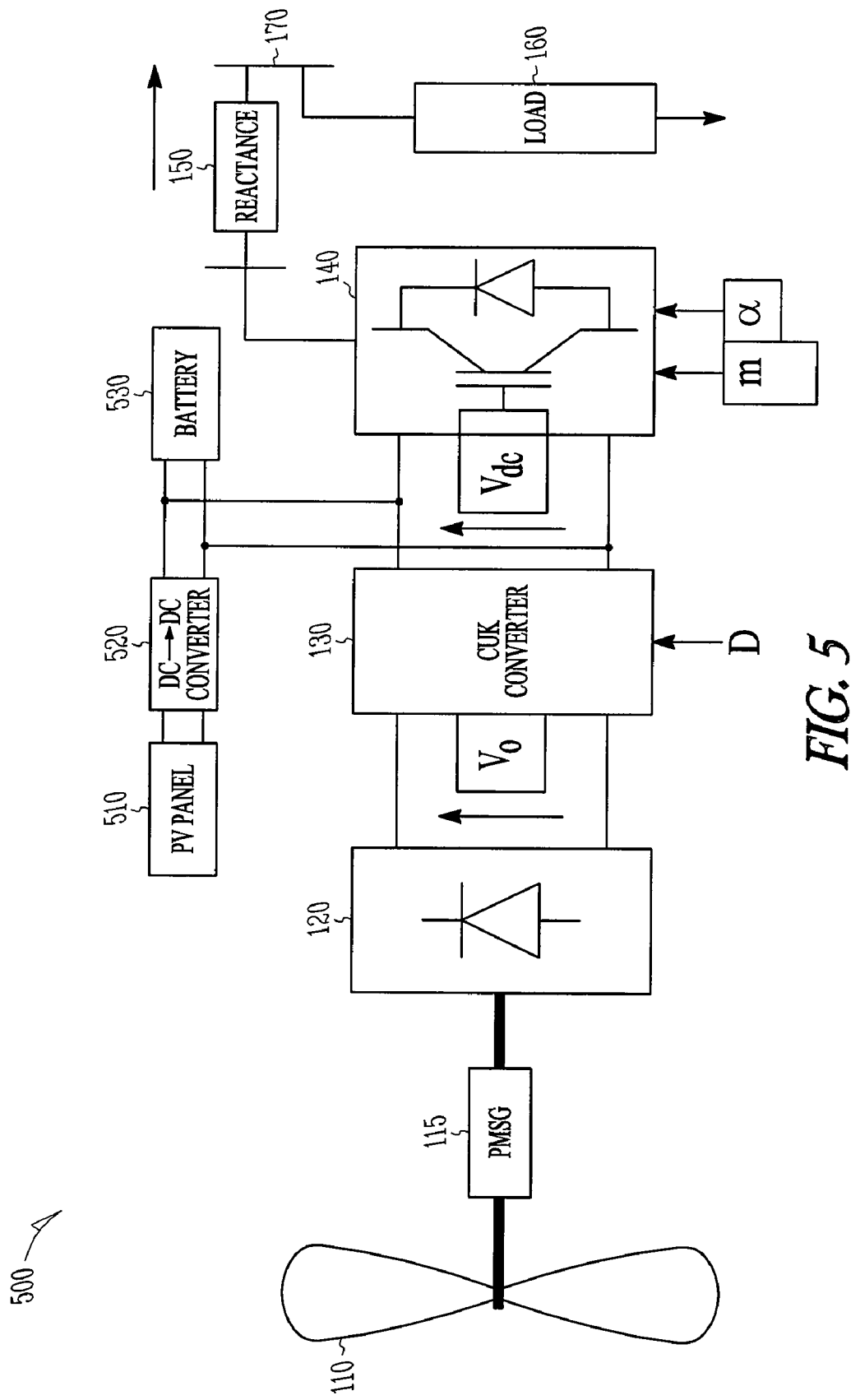
FIG. 5 is a block diagram of an alternative wind energy converter incorporating photo voltaic panels according to an example embodiment.

In a further embodiment shown at 500 in FIG. 5, a hybrid configuration utilizes a photo voltaic (PV) panel 510 along with the micro wind turbine. The PV panel 510 is interfaced to the DC link via a DC-DC converter 520. This interface could be controlled to ensure that the PV panel 510 works at maximum efficiency.

In such a configuration a storage battery 530 can also be used (on the DC side) to store power during excess production and send out power during the deficit period (especially applicable in the stand alone operation).

Figure 6:
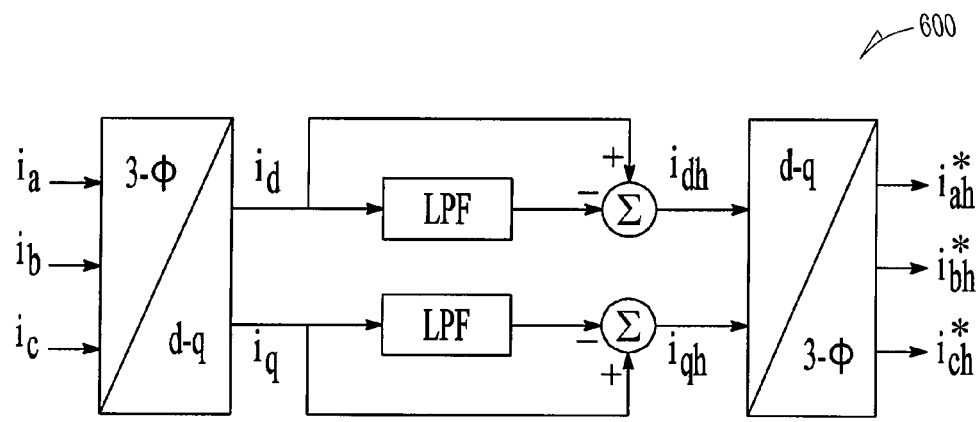
FIG. 6 is a block circuit diagram of a harmonic extraction controller according to an example embodiment.

With few additional features illustrated in a harmonic extraction controller 600 in FIG. 6, the control strategy the inverter 140 can also behave as a power conditioner. The local load 160 may comprise of some harmonic loads. The grid 170 can be completely isolated from any harmonic pollution, and this can be done by supplying the harmonic currents by the inverter 140. This is done using the harmonic extraction controller 600. Harmonic information is extracted from the phase currents $i_a$, $i_b$ and $i_c$ and suitable voltages are injected at the inverter legs to supply harmonic currents $i^*_{ah}$, $i^*_{bh}$, and $i^*_{ch}$.

Figure 7:
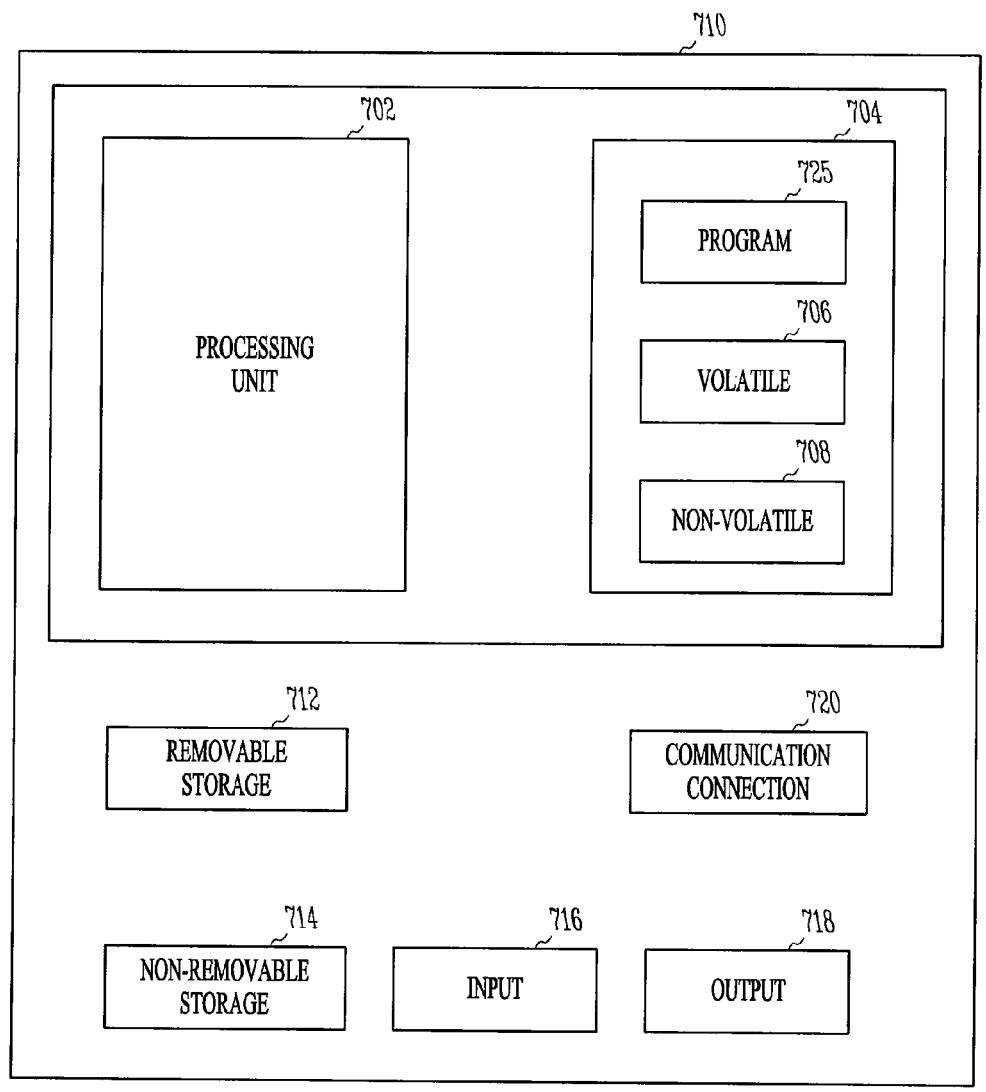
FIG. 7 is a block diagram of a typical computer system that may be used to perform selected functions according to an example embodiment.

A block diagram of a computer system, such as a microprocessor that may be used to execute programming for performing for some of the above calculations is shown in FIG. 7. A general computing device in the form of a computer 710, may include a processing unit 702, memory 704, removable storage 712, and non-removable storage 714. Memory 704 may include volatile memory 706 and non-volatile memory 708. Computer 710 may include—or have access to a computing environment that includes—a variety of computer-readable media, such as volatile memory 706 and non-volatile memory 708, removable storage 712 and non-removable storage 714. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 710 may include or have access to a computing environment that includes input 716, output 718, and a communication connection 720. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 702 of the computer 710. A hard drive, CD-ROM, and RAM are some examples of articles including a computer-readable medium.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A wind energy converter comprising:
   a wind turbine;
   a generator adapted to be coupled directly to the wind turbine without neead for a mechanical gear unit;
   a rectifier coupled to the generator;
   a Cuk converter coupled to the rectifier, the Cuk converter having a duty ratio D controllable by an AC bus voltage controller implementing a proportion/integral loop; and
   an inverter coupled to the converter for providing a regulated AC output to a load;
   wherein a DC bus voltage Vdc is held constant by continuous modulation of the duty ratio D of the Cuk converter during normal wind speeds that produce a varying input voltage Vo so that Vdc=Vo*(D/(1−D)),
   wherein a boost action of the Cuk converter holds the DC bus voltage constant during a dip in wind speeds, and
   wherein a buck action of the Cuk converter holds the DC bus voltage constant during a sudden increase in the wind speeds.

2. The wind energy converter of claim 1 wherein the converter comprises a buck-boost converter that converts a variable amplitude voltage to a variable DC bus voltage.

3. The wind energy converter of claim 1 and further comprising a stall control operable for stalling the turbine if the wind speed increases beyond the rated speed of the generator.

4. The wind energy converter of claim 1 wherein the rectifier is uncontrolled and converts a variable frequency and variable amplitude voltage from the generator to a variable DC bus voltage.

5. A wind energy converter comprising:
   a generator adapted to be coupled directly to a wind turbine without need for a mechanical gear unit, wherein the generator provides a variable frequency and variable amplitude signal;
   a rectifier coupled to the generator that converts the signal provided from the generator to a DC bus voltage;
   a converter coupled to the rectifier that provides a regulated DC bus voltage as a function of a controlled duty cycle; and
   an inverter coupled to the converter for providing an AC bus output to a load;
   wherein the DC bus voltage Vdc is held constant by continuous modulation of the controlled duty cycle D of the converter during normal wind speeds that produce a varying input voltage Vo so that Vdc=Vo*(D/(1−D)),
   wherein a boost action of the converter holds the DC bus voltage constant during a dip in wind speeds, and
   wherein a buck action of the converter holds the DC bus voltage constant during a sudden increase in the wind speeds.

6. The wind energy converter of claim 5 and further comprising:
   a DC bus voltage sensor;
   an AC phase voltage sensor; and
   an AC phase current sensor.

7. The wind energy converter of claim 5 and further comprising a phase locked loop controller coupled to the inverter.

8. The wind energy converter of claim 5 and further comprising a harmonic extraction controller coupled to the inverter.

9. The wind energy converter of claim 5 wherein the converter comprises a Cuk converter having a controllable duty ratio.

10. The wind energy converter of claim 9 wherein the duty ratio of the Cuk converter is controlled by an AC bus voltage controller implementing a proportion/integral control loop.

11. The wind energy converter of claim 10 wherein the DC bus voltage is held constant by continuous modulation of the duty cycle of the Cuk converter during normal wind speeds.

12. The wind energy converter of claim 10 wherein a boost action of the Cuk converter maintains DC voltage constant during a dip in the wind speed.

13. The wind energy converter of claim 5 and further comprising a stall control operable for stalling the turbine if the wind speed increases beyond the rated speed of the generator.

14. The wind energy converter of claim 5 wherein the rectifier is uncontrolled and converts a variable frequency and variable amplitude voltage from the generator to a variable DC bus voltage.

15. A method comprising:
   converting rotational energy directly from a wind turbine via a permanent magnet generator to generate a variable frequency and variable amplitude signal;
   rectifying the signal provided from the generator to provide a DC bus voltage;
   converting the DC bus voltage to a regulated DC bus voltage as a function of a controlled duty cycle, the converting including:
      holding the DC bus voltage Vdc constant during normal wind speeds that produces a varying input voltage Vo by continuously modulating the controlled duty cycle D so that Vdc=Vo*(D/(1−D)),
      invoking a boost action to hold the DC bus voltage constant during a dip in wind speeds, and
      invoking a buck action to hold the DC bus voltage constant during a sudden increase in the wind speeds; and
   inverting the regulated DC bus voltage signal to provide an AC bus output.

* * * * *